July 15, 1941.    J. N. H. CHRISTMAN ET AL    2,248,959
AIR CONDITIONING APPARATUS FOR ISOLATED SPACES
Filed Nov. 1, 1939    5 Sheets-Sheet 1

INVENTORS
JOHN N. H. CHRISTMAN &
WILLIAM A. LINTERN
BY
THEIR   ATTORNEY.

July 15, 1941.  J. N. H. CHRISTMAN ET AL  2,248,959
AIR CONDITIONING APPARATUS FOR ISOLATED SPACES
Filed Nov. 1, 1939  5 Sheets-Sheet 3

INVENTORS
JOHN N. H. CHRISTMAN &
BY  WILLIAM A. LINTERN

THEIR ATTORNEY.

July 15, 1941.  J. N. H. CHRISTMAN ET AL  2,248,959
AIR CONDITIONING APPARATUS FOR ISOLATED SPACES
Filed Nov. 1, 1939  5 Sheets-Sheet 4

INVENTORS
JOHN N. H. CHRISTMAN &
BY   WILLIAM A. LINTERN

THEIR   ATTORNEY.

Patented July 15, 1941

2,248,959

UNITED STATES PATENT OFFICE 2,248,959

AIR CONDITIONING APPARATUS FOR ISOLATED SPACES

John N. H. Christman, Cleveland, and William A. Lintern, Brook Park Village, Ohio, assignors to The Lintern Corporation, Cleveland, Ohio, a corporation of Ohio Application November 1, 1939, Serial No. 302,394

5 Claims. (Cl. 219—39)

This invention relates to an air conditioning apparatus for isolated spaces such as in industrial crane cabs, isolated mill or shop offices, operating stands in steel mills, outlying small buildings for electrical transmission equipment, etc. The embodiment of the invention illustrated herewith is for use on mill crane cabs, application of the principles in other environments being believed apparent therefrom.

Crane cabs, in order not to interfere with the work of the cranes on which mounted, usually have only sufficient enclosed space to enable the operator to move about the necessary distance in order to operate the crane controls. Consequently, such cabs become exceedingly uncomfortable for the operators, both from lack of fresh air and because of extremes in temperature within the cab—sometimes excessively hot and sometimes excessively cold. The limited space and environment of operation makes the cabs difficult to maintain in conditions conducive either to health or comfort. The problem in connection with heating and cooling crane cabs is affected to a considerable extent by the practically necessary heat conducting relationship of the cab body and frame-work to heavy steel portions of the crane on which the cab is necessarily mounted. For example, such heavy portions cannot be prevented from becoming heated when exposed to hot regions of a mill as over a soaking pit or furnace, and the framework of the cab tends to attain the same temperature as that of the heavy parts mentioned. Insulation of the walls of the cab is therefore only partially effective in keeping the temperature of the interior of the cab at the desired lower degree or level. The reverse obtains when the crane operates in exposed areas in cold weather.

In view of the above, an object of the present invention is to provide a ventilating and cooling and/or heating apparatus which is practically adapted for use in spaces such as mentioned without having to alter materially or to enlarge the spaces in order effectively to accommodate the same.

A further object is to provide an isolated space air conditioning system and apparatus by which the desired effective temperatures in the space can be attained and regulated without disproportionate expense either in installation or operation. Effective temperature as distinguished from actual temperature is considered in relation to occupants of spaces to be conditioned. The factors in determining effective temperature are actual (dry bulb) temperature, humidity and air movement.

A further object is to provide an efficient and compact air conditioning apparatus for isolated spaces in industrial plants and the like.

Another object is to provide an air conditioning apparatus having an improved means for enabling high wattage electric heating elements to be used economically for imparting heat to air supplied in fairly large volumes.

Other objects include the provision of an economical and effective means for introducing large volumes of air into efficient heat exchange relationship to a battery of electrical resistance heating elements, a high wattage, multiple electric heat exchange unit of compact form which requires no special insulation for safe use, and a heating and ventilating unit for isolated spaces, which unit is inexpensive to manufacture and relatively easy to install in existing structures requiring heating and/or ventilating without substantial change in said structures.

Other objects and features of the invention will become apparent from the following description of the exemplary forms shown in the drawings.

Referring to the drawings, Fig. 1 is an end elevation of a crane cab of a common type with the heating, ventilating, and cooling system hereof applied thereto;

Figure 1:
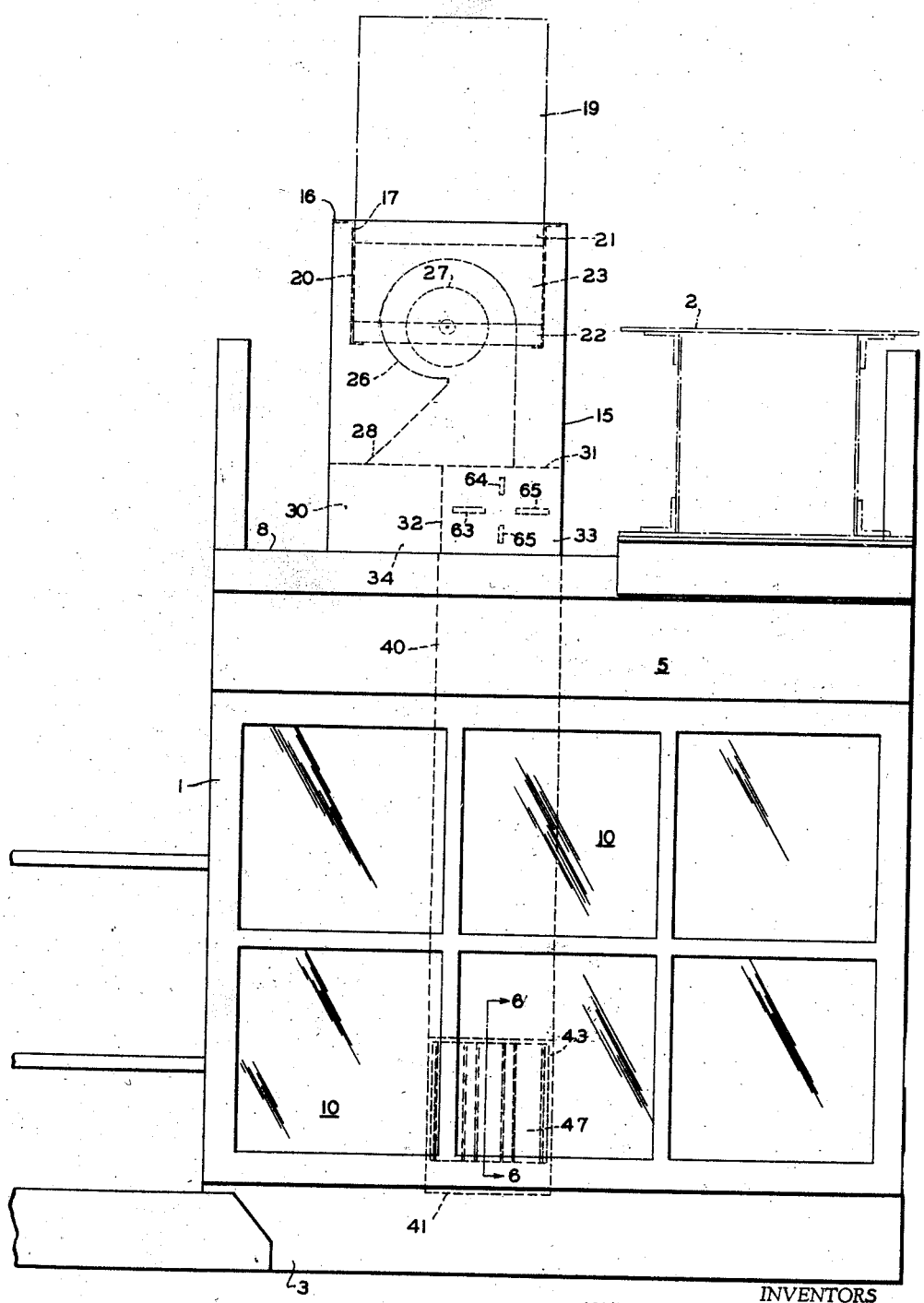
Figure 2:
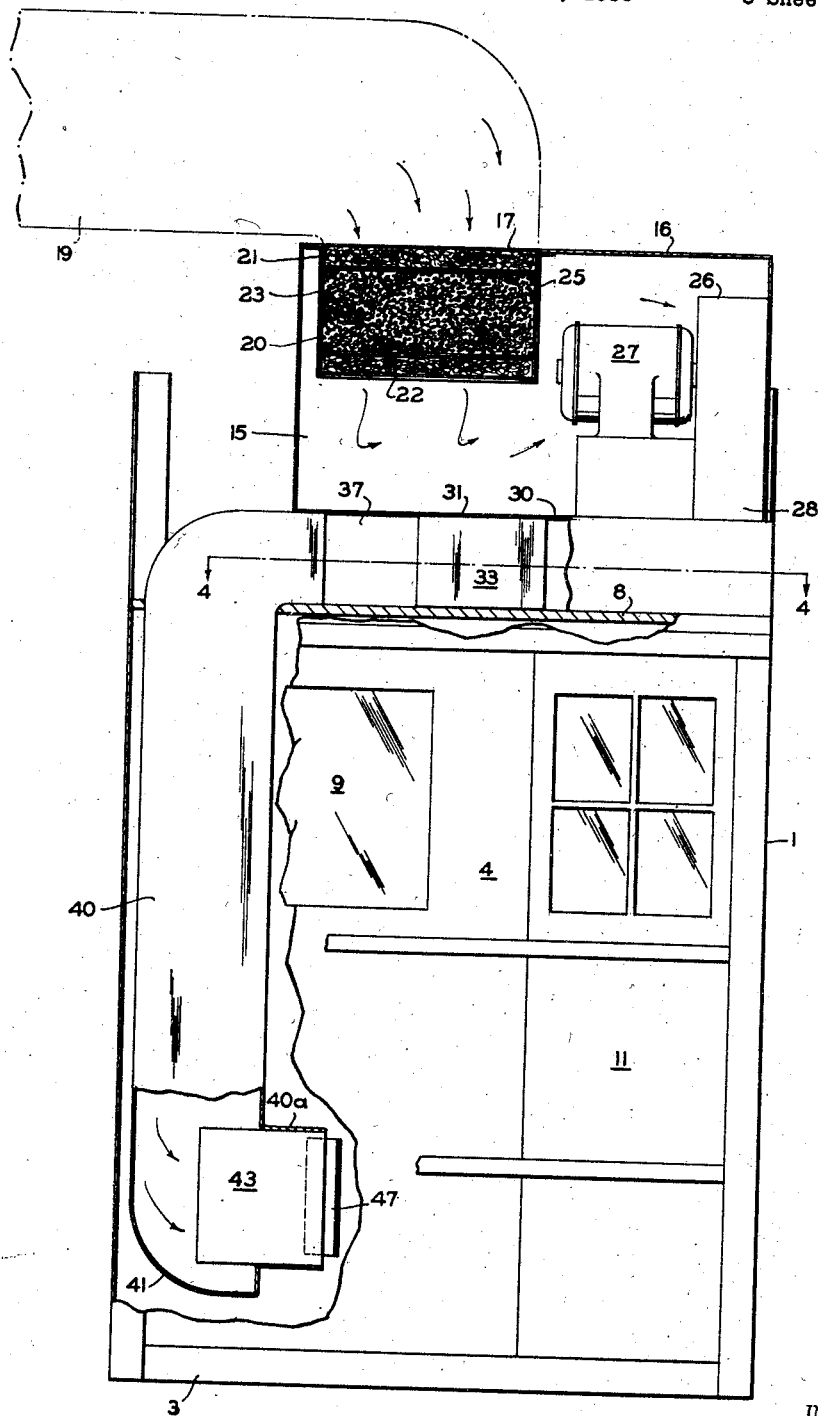
Fig. 2 is a side elevation of the same.
Figure 3:
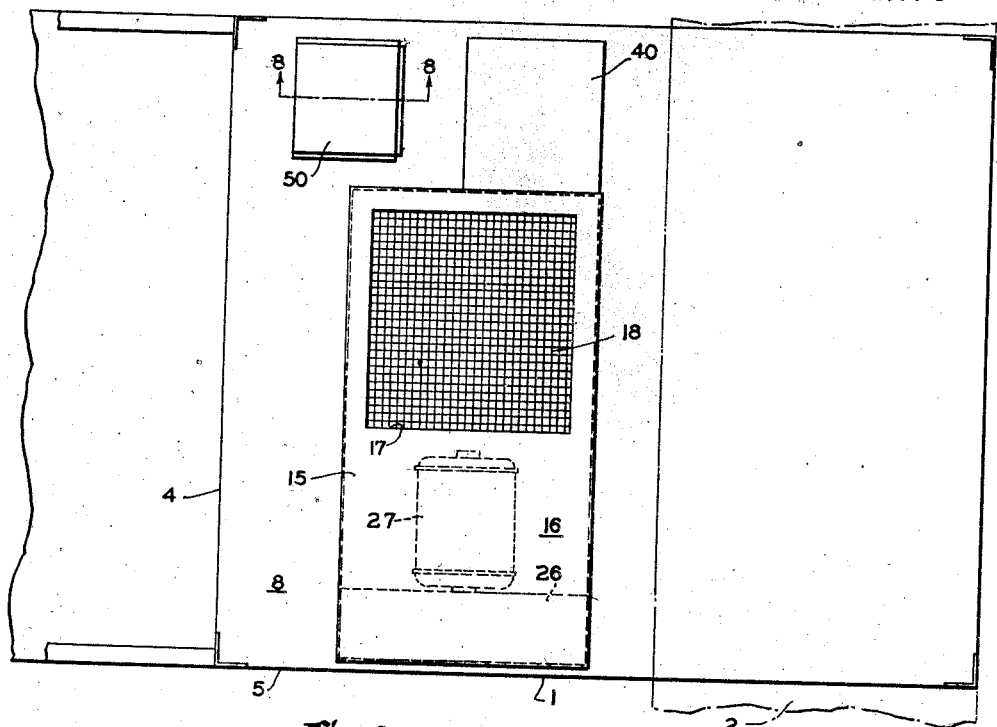
Fig. 3 is a plan view thereof.

In the embodiment of the invention shown in Figs. 1 to 3, a crane cab of conventional construction is shown at 1 suspended as from a box girder 2 (shown only in broken lines). The cab body has a floor sill structure 3, four side walls, two only of which are shown at 4 and 5, and a roof structure 6. The body comprises conventional structural shapes and the walls for the most part are structural frame members and steel plates, into or at the edges of which latter are set observation windows such as 9 and 10 and an entrance door 11. The windows are usually double and sealed at their frames so as to afford protection against infiltration of fumes and some protection against heat and cold. For effective use of the present apparatus it is recommended that the walls be insulated on the inside as by sheets of building material of low heat conductivity and with air cells or equivalent means to reduce convection loss, etc., as well understood, and the windows and doors kept closed at such times as the cab is exposed to excessive heat or cold or dangerous fumes.

Crane cabs in mills are usually mounted on the crane structures with the cab roof portions approximately in horizontal alignment with a series of windows in the side wall of the building, all of which are kept open during hot weather and some of which are always kept open, and accordingly, wherever possible, we arrange to take air into the conditioning apparatus at a point as close as practicable to such windows.

Figure 4:
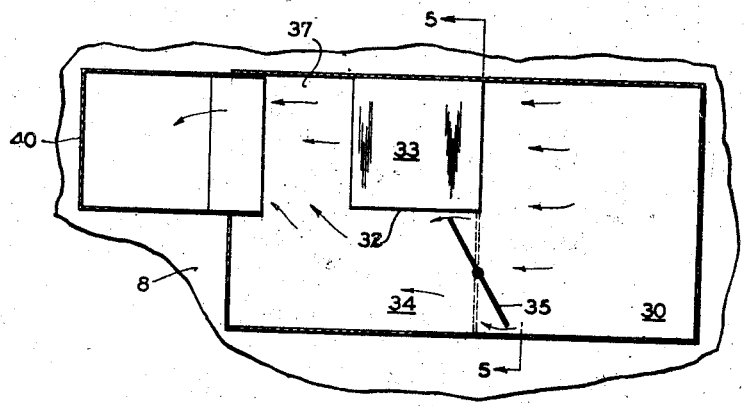
Fig. 4 is a sectional plan view taken substantially along the line 4—4 on Fig. 2.
Figure 5:
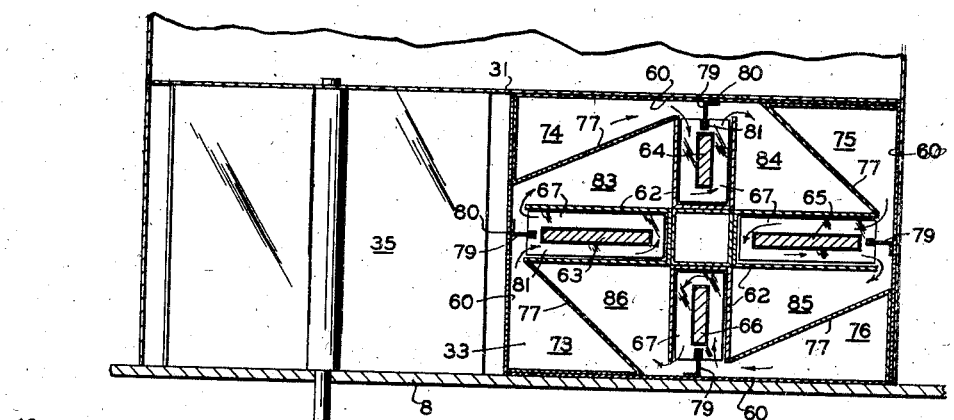
Fig. 5 is a sectional view taken substantially along the line 5—5 on Fig. 4.
Figures 6, 7:
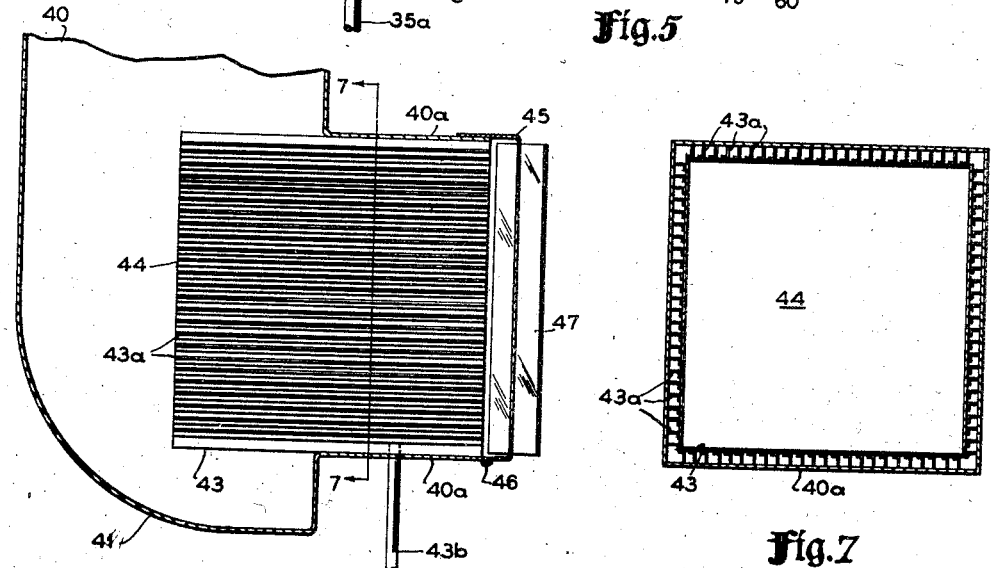
Fig. 6 is a detailed sectional view of a cooling and air distributing unit taken substantially along the line 6—6 on Fig. 1.
Fig. 7 is a detailed sectional view taken as indicated at 7—7 on Fig. 6.

Mounted as on the roof of the cab is a casing 15 in the form of a rectangular hollow box made up as from sheet metal and generally closed at all exposed sides. As shown in Fig. 3, the casing is partially closed at the top by a wall 16 having an opening 17 guarded by an appropriate grill or screen 18. The grill or screen is readily removable from the casing. The casing 15 and its contents constitutes a self-contained blower, heater, and air filter unit, the relative arrangement of parts of which may be as shown in Figs. 4 to 6, inclusive. An air pipe 19 (shown only in broken lines in Figs. 1 and 2) can be attached to the casing 15 in communication with the opening 17 when it is desired to bring air thereto from a remote point. Such a pipe can ordinarily be supported in part on the crane frame and lead to a point closer to the windows of the mill mentioned above. A hood, in place of tube 19, facing the windows is of considerable assistance in cases where the cab has to move away from the region of the windows at times, as on a stripper crane.

Vertically aligned with the screened opening 17 and adjacent thereto is a tube 20 into which may be inserted, by removing the grill, a plurality of air filter sections, preferably arranged as follows:

Two conventional air filter frames 21 and 22 occupy the innermost and outermost portions of the tube, and an intermediate removable framework 23 contains a body of air filtering and purifying material 25 such as activated carbon granules, suitably contained and rendered accessible for entrance and exit of air adjacent the units 21 and 22. With this arrangement, air is filtered immediately upon being received into the tube 20 before coming into contact with the activated carbon, thus preventing the shortening of the effective life of the carbon by filtering substantially all dust and foreign matter from the air before it reaches the carbon. After passing through the body of activated carbon, which latter removes fumes and smoke, the purified air is filtered by the section 22, principally for the purpose of preventing carbon dust from entering the cab. After passing through the filtering and purifying unit, the air passes into the inlet opening of a sirocco-type blower 26 situated within the box 15 and having a conventional casing and squirrel-cage impeller, to the latter of which is connected an electric motor 27.

As shown, the outlet end of the blower casing discharges downwardly as through an enlarged portion 28 of the casing and into a rectangular space 30 below a horizontal partition 31. The motor and blower may be mounted on the partition 31. The space 30 is divided as by a partition 32 so that air delivered by the blower can flow partly through a heater unit 33 (of special form to be later described), and partly through a duct 34 at one side of the heater and which is open at both ends. A suitable damper such as indicated at 35, Fig. 4, at the inlet of the duct 34, may be employed to divert air received through the discharge portion 28 of the blower casing entirely through the heater, in the position of the damper shown in broken lines in Fig. 4, and partly through the heater and partly through the duct 34, in the position of the damper shown in full lines. The damper can be adjusted as by means of a downwardly extending shaft 35a, Fig. 5 and a handle thereon (not shown) within the cab. The discharge portion of the heater and discharge end of the air duct 34 are connected to a duct 37 which is open at one end of the box 15 below the partition 31.

The unit above described may be supplied to users without any further duct arrangements for air discharged through the duct 37, and when the space to be conditioned is adequate to house the unit, then an air deflecting grill of suitable form (not shown) is usually provided at the discharge end of the duct 37.

To adapt the unit to the special purposes above mentioned a sheet metal duct 40 is provided, having its inlet portion secured to the discharge opening of the duct 37. Such duct 40 may be applied to the cab either internally of it or externally along one of its vertical walls. This duct 40 may be suitably insulated to avoid heat loss, and in any event, it is insulated from the cab wall so as to avoid heat losses by conduction to and from the cab body. The lower end 41 of the duct 40 is preferably arranged to discharge generally horizontally into the cab at a point near the floor structure 3. When an unusual degree of cooling is desired, a box-like structure 43 is built into the lower end portion 41 of the duct 40 so as to receive either air cooling material, for instance, dry ice in a container or an evaporator unit of a refrigerating system. Dry ice is preferred because a small block of it, say a 10" cube, will last from 6 to 8 hours and function to lower the temperature of incoming air as much as 5° F.

Figs. 6 and 7 show a suitable arrangement for supporting such block or package of refrigerant such as dry ice in heat exchange relation to air brought into the cab through the duct 40. 43 is a container structure with peripherally closed walls at the sides, top, and bottom and also closed at the back 44 within the duct 40. The horizontal tubular extension 40a of the duct 40 serves as a support for the container 43 and the latter can be slid into place and maintained in spaced relation to the inner peripheral surfaces of the extension 40a by a series of fairly closely spaced fins or flanges 43a on the container 43. Access to the container 43 for placement of refrigerant therein and provision for distributing air caused to flow around the container may comprise a closure member in the form of a door 45 horizontally hinged as at 46 at the free end of the extension 40a. Any suitable means, for example a latch, may be provided for holding the closure member in upright closing relation to the extension 40a and in refrigerant retaining relation to the container. The closure member, as shown, is in the form of a shell which, in closed position, communicates with the spaces maintained by the fins or flanges 43a for passage of air around the container and out of the duct extension 40a. A suitable grill may comprise vertically hinged plates or louvers 47 on the door 45 adapted for simultaneous adjustment in a well known manner to direct the currents of air within the cab.

Vapor from frozen carbon dioxide is odorless and is evolved so slowly that the vapor can simply be mixed with the air discharged from the duct extension 40a without harmful effects. If desired, however, a tube such as 43b may be arranged in communication with the interior of the container 43 and the exterior of the cab as through a bottom or side wall of the latter, in which event an outer end cover for the container would be provided, either as part of the closure member 45 or separate therefrom as desired.

Figure 8:
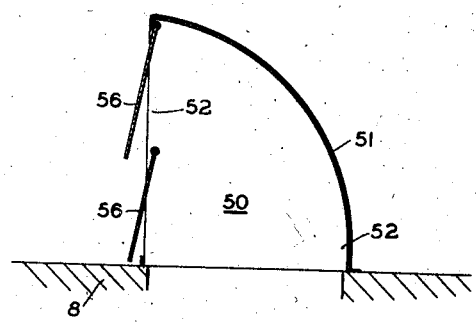
Fig. 8 is an enlarged sectional view taken on the line 8—8 in Fig. 3.

As mentioned above, the cab walls generally are kept as nearly sealed as possible, and, in order to build up and maintain in the cab sufficient pressure so that all the air received into the cab will be through the air conditioning unit, the outlet for air is proportioned in relation to the air delivered by the unit. With this in view, a one-way outlet is provided in a wall of the cab, which outlet has a rated capacity less than the capacity of the conditioning unit to deliver air to the cab. As shown, a one-way acting valve or damper arrangement 50 is provided, as on the roof of the cab; see particularly Figs. 3 and 8. This may comprise simply a hollow frame or hood 51 fixed over an opening in the roof of the cab and having one or more through openings 52 discharging air from the hood. Each of the discharge openings has a damper plate 56 hinged adjacent thereto, the damper plates being normally held by gravity in closing relation to the openings 52. Rise in pressure within the cab, beyond a predetermined amount, swings the dampers 56 outwardly, allowing relief of excess pressure, and the dampers then close automatically, blocking reentrance of air and fumes from outside the cab. Appropriate abutment means are provided to prevent the plates from swinging inwardly through the openings 52.

Referring further to Figs. 1 and 5, the casing of the heater unit 33 may comprise a rectangular sheet metal box-like member with four side walls 60, all substantially alike. One of the side walls constitutes a supporting base for the heater unit. Within the hollow space enclosed by the walls 60 is a cruciform arrangement of heater supporting frames 62. Each of these, before assembly into the box, receives an electrical resistance strip heater, these being designated 63, 64, 65 and 66. The strip heaters are of a known type having radiating fins 67 in spaced apart relationship along the metal envelope of the strip and for substantially the entire length of it. The strips would usually be of the same cross section, although as illustrated in Fig. 5, the strips 63 and 65 are broader than the other two. Suitable electrical connections (not shown), are made with the strips 63—66 at respective ends of the strips.

Four inlets are provided in the inner end header of the duct provided by the walls 60, these being at the corner portions of the inner header and indicated at 73, 74, 75 and 76. The inlet 73 serves the strip 63; 74 serves the strip 64, etc., around the casing. Air entering the individual inlets is blocked from general dispersion within the casing 59 by oblique partition members 77 extending from end to end of the box-like casing and which bear the same relationship to respective inlet openings and to the strip assemblies of the strip heater units. Such air entering the inlet 73 is diverted by the partition 77 into heat exchange relationship with the radiating fins 67 of the heater strip 63 and is blocked from by-passing the radiating fin assembly partly by a partition 79, one edge of which abuts the adjacent casing wall 60 as at 80, and the other edge marginal portion of which projects into slots 81 in the various fins 67 of the heater 63, so that the inner edge of the partition lies close to the narrow edge portion of the strip 63 for the entire length of the partition. Each of the frames 62 is channel shaped and extends from end to end of the casing and on three sides of the finned strip heater enclosed thereby substantially in peripheral contact with the free edges of the radiating fins on three sides of the strip as shown in Fig. 5. The free edges of each frame 62 are spaced from the adjacent wall 60 for the entire length of the casing. Thus, the air is forced to travel entirely around the strip 63 past and in heat exchange relationship to all portions of the fins. The air, after absorbing heat from the radiating fins, is discharged through respective outlet ducts 83, 84, 85 and 86 in the outer end header, and which correspond to the heater strips 63, 64, etc. around the casing. The baffle or partition members 79 which also extend from end to end of the casing preferably do not make contact with the radiating fins 67 of the various heaters and hence do not conduct heat directly therefrom to the outer walls of the casing 33. Accordingly, the walls 60 do not have to be insulated, for whenever the heaters are energized, the blower motor is also energized, and an adequate volume of air is projected through each of the four portions of the heater unit sufficient to keep the walls 60 from becoming dangerously hot.

The heater strips by reason of their mountings and disposition in the conditioning unit and heater ducts above described can use effectively fairly high voltage. For industrial use 230 volt D. C. current is recommended.

In order that the heater may function safely with varying capacities for heating, and, selectively, for supplying air without heat, for cooling the space to be conditioned, we have arranged to supply current to groups of the strip heaters in a selective manner, and in such relationship to the supply of power to the blower that proper operation of the blower is a condition precedent to any operation of the heaters. The strips 63 and 65 may comprise one group and strips 64 and 66 the other. For convenience, these combinations are indicated at H1 and H2 on the diagram.

Figure 9:
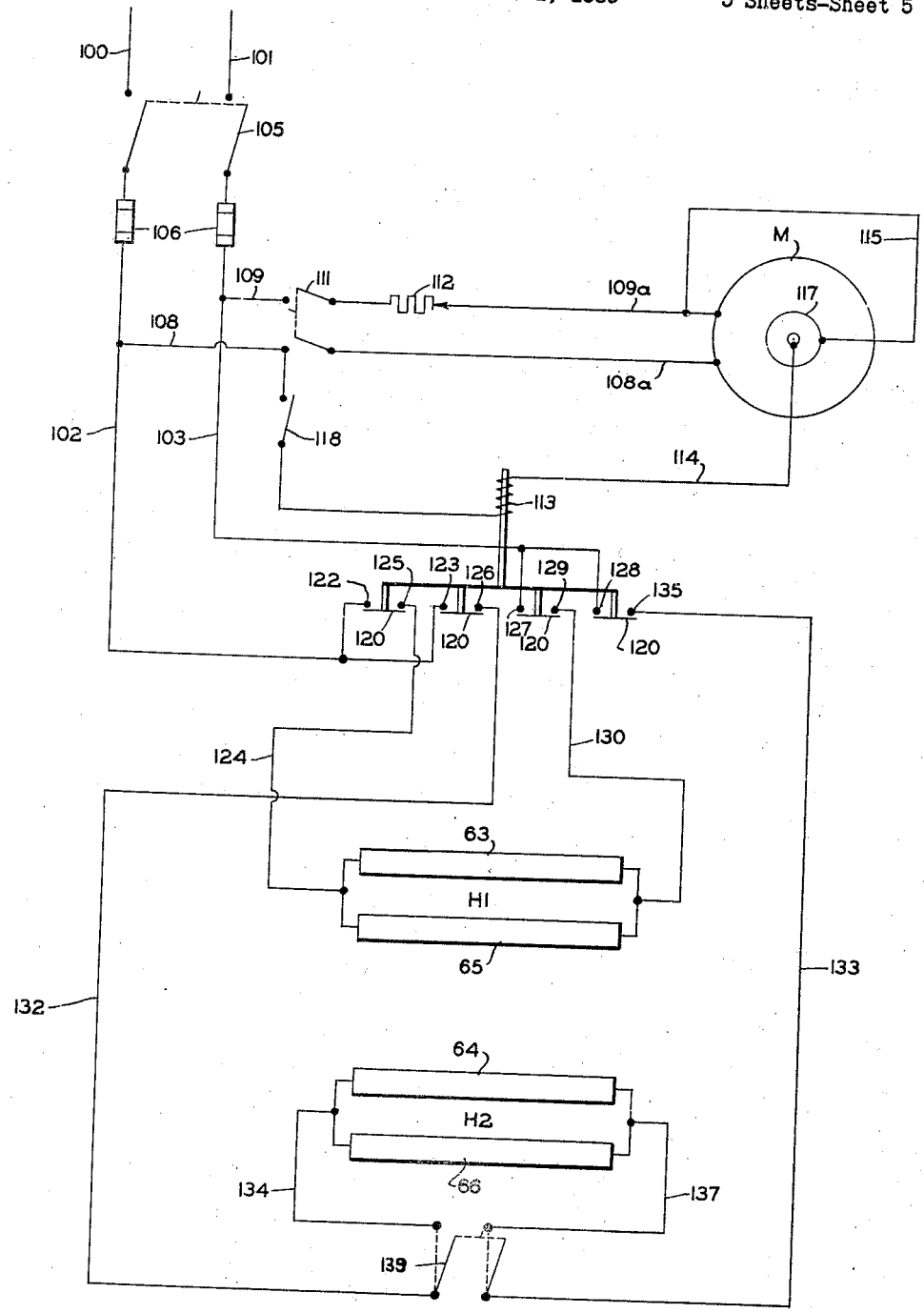
Fig. 9 is an electrical diagram showing the preferred control arrangement for the system.

If each of the strip heaters has a capacity of 1100 watts, then control of current from on to off condition would ordinarily cause sparking and rapid deterioration of the switch or contactor points. Therefore, we have arranged for the supplying of current to the two groups of heaters in such manner that the heavy electrical circuits are broken automatically at a number of points and the destructive effects thereby divided proportionately upon interruption of supply of current to the heaters. The heaters are so arranged in the circuits that premature energization of the heater elements cannot take place until the blower is actually in operation irrespective of the operating condition of the motor windings and other parts of the motor supply circuit at the time, and so that the heating cannot continue in the event of motor failure. A suitable circuit for accomplishing the objectives above outlined is shown in Fig. 9.

Lines 100 and 101 represent current supply, the same being connectable to lines 102 and 103 of the control circuit hereof as through a service switch 105 and safety fuses 106. The lines 102 and 103 are connected as by lines 108 and 109 with a motor circuit 108a and 109a as through a double pole switch 111. An overload circuit breaker and resistance element 112 is incorporated in the line 109a of the motor supply circuit. Closing of the switch 111 is the first operation in controlling the conditioning unit, this energizing the motor M.

When the motor has attained operating speed, the coil of a magnetic contactor, shown diagrammatically at 113, is energized through a circuit 114–115, which includes a motor operated centrifugal switch 117 and a manually operable heater actuating switch 118. If only the supply of air for cooling is desired then the switch 111 is closed, but the heater actuating switch is not closed. If a first stage of heating together with air flow is desired, then the switches 111 and 118 are both closed. Closing of the switch 118 will not cause energization of either group (H1 or H2) of heater elements unless the motor has attained proper operating speed, the latter control function being accomplished by the centrifugal switch 117 as will be obvious from the drawing.

When the magnetic contactor is caused to function by closing of the centrifugal switch contacts then a plurality of contactor elements 120 are closed as by a common movable supporting member influenced by the magnetic coil of the contactor. The main line 102 from the service line 100 is connected to alternate points indicated at 122 and 123 of the magnetic contactor and two of the heater strips (63 and 65 as shown) are connected as by a line 124 to the point 125 of the contactor which cooperates with the point 122.

The other main line 103 is similarly connected to alternate points of the contactor at 127 and 128. A point 129 cooperatively arranged with respect to point 127 is connected as by a line 130 to the strip heater group H1, the individual strips being in parallel with the circuits 124 and 130.

The strip heater group H2, as by lines 132 and 133, is capable of energization by the magnetic contactor by reason of the line 132 at point 126 of the contactor and a line 134 associated with the heater group H2 and connection of the line 133 with a point 135 (paired with 128) and a line 137 which, with the line 134, forms a parallel circuit for the heater group H2. The circuits from the contactor to the heater group H2 can be controlled by a manually operable double pole switch 139, the operation of which will be obvious from the diagram, Fig. 9.

From the above it will be seen that if the switch 139 is in the position shown in full lines, Fig. 9, when the centrifugal switch operates to energize the magnetic contactor, then operation of the latter will effect supply of current only to the heater group H1 and that if the switch 139 is in the position shown by broken lines then, upon operation of the magnetic contactor, both heater groups will be energized. Thus by closing the first heater switch 118 and energizing the motor circuit by closing the switch 111, moderately warmed air is supplied to the cab at full volume, for instance 800 cu. ft. per minute as determined by the design of the motor and blower, and by closing the switch 139 a higher degree of heat is obtained with the same volume of air. By the use of a suitable rheostat, or its equivalent, not shown, the motor could be speeded up when the additional supply of heat is afforded, but it has been found that the cab ordinarily attains a more comfortable effective temperature sooner by the supply of air at full volume. Should the motor slow down or be stopped by opening of the switch 111, then the supply lines 102 and 103 are immediately disassociated from all of the heaters by the automatic operation of the magnetic contactor through the agency of the centrifugal switch, and the heavy current flow is interrupted at numerous points thereby reducing sparking and resultant detrimental effects on the individual break points.

Certain features herein shown and relating particularly to the filtration and purification of air prior to introduction thereof into association with the working parts of an apparatus such as shown herein are claimed in our copending application Serial No. 350,448, filed August 3, 1940.

We claim:

1. In an air conditioning apparatus comprising a duct having an air inlet, a power driven blower operatively within the duct constructed and arranged to force air received from the inlet in a predetermined direction in the duct, a heater unit in the duct including a chamber having an inlet communicating with a discharge portion of the blower and having a plurality of electrically operable strip heaters therein with radiating fins extending transversely of the longitudinal axes of the strips and on opposite sides of the strips, dividing means in the chamber so arranged that air received at the inlet portion of the chamber is passed first on one side of each individual strip between the fins thereof and then on the opposite side between said fins, and outlet means for the chamber for delivering the heated air to a point beyond the heater.

2. In an air conditioning apparatus comprising a blower and a duct arranged to receive air from the blower, said duct having a plurality of electrically operable strip heaters therein with radiating fins on opposite sides of the respective strips and extending transversely of the longitudinal axes of the strips, and dividing means in the duct so arranged that air received at one end of the duct is passed in circumferential relation to the strips between the fins thereof from one side of each strip around the same to the other side thereof and then is discharged at the opposite end of the duct.

3. In an air conditioning apparatus having air forcing means and a duct having an inlet adapted to receive air therefrom, a strip heater disposed in said duct and having transversely extending radiating fins extending around the same from one side of the strip to the other, means within the duct lengthwise of the strip and encasing three sides of the strip and substantially in peripheral contact with the free edges of the fins on such three sides, means associated with the inlet of the duct to direct air received thereinto between one side of the strip and the encasing means, along the fins, and an outlet for the duct communicating with the space between the opposite side of said strip and the encasing means.

4. In an air conditioning system having an air duct and air forcing means associated therewith in a manner to blow air therethrough and a heater casing incorporated in the duct, said casing having end walls, a peripherally continuous side wall connecting the end walls, a plurality of channel-shaped frames extending from one end wall to the other with their flanges spaced from respective side wall portions, strip heater elements disposed lengthwise in the channels and with radiating fins extending around the strip elements at least on three sides thereof and in peripheral contact with the inner surfaces of the channels, means extending from end wall to end wall and connected with side wall portions adjacent the open sides of the channel and coacting with the strip elements in a manner to establish air paths around the strips along the inner surfaces of the channels and definite inlet and outlet passages adjacent respective flanges of the channels, partition means extending longitudinally of the casing from end to end and dividing the spaces between the channels into longitudinal ducts, part of which ducts communicate with said inlet passages only and part with the outlet passages only, one end wall having inlet openings communicating with respective longitudinal ducts which in turn communicate with the inlet passages of the channels and the other end wall having outlet openings communicating with the remainder of said longitudinal ducts.

5. A heat exchange apparatus comprising a casing having an inlet and an outlet, an electrical resistance heater in said casing comprising a flat heater core strip having transversely extending radiating fins thereon on opposite broad sides of the core spaced apart from each other, and air confining and conducting means in the casing extending into substantially abutting relationship with the free edges of the fins on said opposite sides of the core, said means being constructed and arranged relative to the casing so as to prevent passage of air from the inlet to the outlet except through the spaces between the fins transversely of the core, the casing and said means providing an air distributing manifold with respect to said spaces between the fins.

JOHN N. H. CHRISTMAN.
WILLIAM A. LINTERN.